(12) United States Patent
Jung et al.

(10) Patent No.: US 8,521,383 B2
(45) Date of Patent: Aug. 27, 2013

(54) METHOD FOR CONTROLLING AN AUTOMATED CLUTCH SYSTEM

(75) Inventors: Mario Jung, Sinzheim (DE); Olaf Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/396,882

(22) Filed: Feb. 15, 2012

(65) Prior Publication Data

US 2012/0143452 A1 Jun. 7, 2012

Related U.S. Application Data

(63) Continuation of application No. PCT/DE2010/000936, filed on Aug. 5, 2010.

(30) Foreign Application Priority Data

Aug. 20, 2009 (DE) .......................... 10 2009 038 193

(51) Int. Cl.
*F16D 13/58* (2006.01)

(52) U.S. Cl.
USPC .............................................. 701/67; 701/87

(58) Field of Classification Search
None
See application file for complete search history.

(56) References Cited

U.S. PATENT DOCUMENTS

2009/0112428 A1* 4/2009 Sah ................................. 701/67

FOREIGN PATENT DOCUMENTS

| DE | 10237793 | 3/2003 |
| DE | 102006030142 | 1/2008 |
| DE | 4042757 | 9/2008 |
| EP | 0494608 | 7/1992 |
| EP | 1058019 | 12/2000 |
| EP | 1298341 | 4/2003 |
| WO | 03100279 | 12/2003 |
| WO | 2006100399 | 9/2006 |

\* cited by examiner

*Primary Examiner* — Mary Cheung
*Assistant Examiner* — Yuen Wong
(74) *Attorney, Agent, or Firm* — Simpson & Simpson, PLLC

(57) ABSTRACT

A method for controlling an automated friction clutch that is located between a drive motor and a transmission in a motor vehicle that is equipped with fraction control and driving condition recognition for detecting current driving conditions.

5 Claims, No Drawings

METHOD FOR CONTROLLING AN AUTOMATED CLUTCH SYSTEM

CROSS-REFERENCE TO RELATED APPLICATIONS

This application is filed under 35 U.S.C. §120 and §365(c) as a continuation of International Patent Application No. PCT/DE2010/000936 filed Aug. 5, 2010, which application claims priority from German Patent Application No. 10 2009 038 193.7 filed Aug. 20, 2009, which applications are incorporated herein by reference in their entireties.

FIELD OF THE INVENTION

This invention relates generally to a method for controlling an automated clutch system.

BACKGROUND OF THE INVENTION

Internal combustion engines of motor vehicles have a certain unevenness of rotation. This unevenness is the more pronounced the fewer cylinders and the more displacement or the more engine torque a vehicle has. Thus, in particular 4-cylinder diesel engines have strong rotation unevenness.

An alternative or optimization option for the dual mass fly wheel is the slippage control. Thus, the clutch is not completely closed for critical engine speeds but, depending on driving conditions, a particular slippage speed is adjusted or regulated so that the drive train is insulated from the engine. The slippage regulation is typically activated based on predetermined speed thresholds.

From the published German application DE 10237793A1, a method for controlling an automated friction clutch is known which is arranged between a motor and a transmission of a motor vehicle. In the known method, operating parameters of the drive train are detected and the clutch is controlled so that it transfers a clutch torque which includes a portion that is essentially a function of the engine torque and a portion that is a function of the slippage. Thus, the disturbance variable that is a function of the slippage of the clutch is detected and an actuator actuating the clutch is controlled so that the clutch transfers a clutch torque which is computed from the operating variables of the drive train and is opened as a function of the disturbance variable so that the disturbance variable remains under a predetermined threshold value. A slippage regulation switch switches to regulation operations as a function of particular operating parameters. The target slippage is changed in a predetermined manner for predetermined driving conditions. The friction clutch can be operated in a slipping condition or in a non-slipping condition.

This rotation unevenness can be felt depending on the resonance frequency of the drive train at different engine speeds through noise and vibrations. A so-called dual mass fly wheel can be used for eliminating or damping these negative properties.

BRIEF SUMMARY OF THE INVENTION

It is an object of the invention to further increase driving comfort.

The method according to the invention provides controlling an automated friction clutch arranged between a drive engine and a transmission in a motor vehicle with slippage regulation and driving situation detection for detecting a currently provided driving situation. The slippage regulation according to the invention is activated in at least one of the following driving conditions:
  during load changes
  after shifting
  after startup
  during temperature changes of the clutch
  after wear adjustment
  after starting up the motor vehicle
  during coasting
  during synchronous driving
  when implementing a slippage activation criterion during slippage in the friction clutch when no slippage control is activated
  during creeping
  during stopping.

DETAILED DESCRIPTION OF THE INVENTION

In a preferred embodiment of the invention, it is provided that a periodic activation of the slippage regulation is provided when no slippage regulation is activated.

In another preferred embodiment it is provided that an activation of the slippage control is provided during a load change when a quantification measure with respect to the drive pedal activation exceeds a threshold value.

In another preferred embodiment, it is provided that a preload portion of the clutch control is lowered when the slippage regulation is activated during load changes.

In another preferred embodiment it is provided that the slippage activation criterion is implemented when the amount of the slippage is above a threshold value which is between 10 and 100 revolutions per minute, particularly preferably 30 revolutions per minute.

According to the invention, also a computer program product with a computer program is proposed which includes software devices for performing the method recited supra when the computer program is executed on a computer. A computer of this type can be part of a control device for controlling an automated clutch.

According to the invention, also a device for controlling an automated friction clutch is provided which is arranged between a drive motor and a transmission in a motor vehicle with slippage regulation and a driving situation detection for determining a currently provided driving situation for performing one of the methods recited supra. Through this device, the slippage regulation is activateable at least in one of the following driving situations:
  during load changes
  after shifting
  after startup
  during temperature changes of the clutch
  after wear adjustment
  after starting up the motor vehicle
  during coasting
  during synchronous driving
  when implementing a slippage activation criterion during slippage in the friction clutch when no slippage control is activated
  during creeping
  during stopping.

The slippage regulation whose principle as stated supra provides that a predetermined target slippage is regulated in the clutch shall still be used in critical engine speed ranges and through consequent use of the slippage regulation option, additionally in driving situations in which slippage regulation is helpful.

Initially, a situation shall be determined in which an activation of the slippage regulation provides comfort improvement or where an activation with respect to robustness (clutch protection, system monitoring) has advantages over conventional strategies. Based on the situation detection, a decision is made regarding activation and deactivation. The decision can be made, e.g., using a condition automation device which can, e.g., be configured as an activation cascade.

Under the recited activation strategies, the following criteria can be differentiated:
1). Comfort improvement;
2). System identification;
3). System monitoring.

Comfort Improvement

Vibration Insulation in Critical Engine Speed Range

Vibration insulation in the critical engine speed range is known in the art and mentioned for reasons of completeness.
Load Change Damping Based on changing the drive pedal angle or the drive pedal travel, wherein the amount of the change and also the speed of the change are evaluated, a degree of quantification between 0 and 100% is computed, wherein 0 means no speed change and 100% means a strong speed change with a high rate of change. Certainly also other numerical values can be used which make the same statement. Thus, the degree of quantification is a function of the amount of the change and also the rate of change of the drive pedal.

When this degree of quantification exceeds a threshold value of e.g. 40%, it is detected that load change damping is required. Thus, the actual values have to be adjusted to the transmission respectively used, the clutch and the transmission and clutch actuators that are being used (the throttle pedal is also designated as drive pedal).

In order to perform load change damping, the slippage regulation is activated and the preload portion is lowered so that the clutch is slightly opened. It depends from many factors how far the preload portion is lowered:
- Degree of quantification: the higher the degree of quantification, the stronger the drop.
- Engine speed: in various engine speed ranges, different reductions are required; currently a differentiation is made between two ranges, wherein any number of ranges is conceivable.
- Tipp in or Back Out: in these two situations, different load change damping and thus different reductions are required.
- Gear: The reduction is a function of the gear.

Also here the actual values have to be adjusted to the components respectively used in the motor vehicle.
Activation for Slippage after Shifting and Startup After shifting and startup, a slipping is required in order to prevent adherence and clutch engagement jolts.

Thus, a regulation torque of the slippage regulator is computed and the slippage regulation is activated according to the invention as soon as operation with an open clutch would be obtained based on the result through the clutch actuator in a direction towards an open clutch.

System Identification (Adaption)

Periodic Activation of the Slippage Regulation for Adaptations

In the slippage phase, a torque equilibrium is provided between the clutch torque and the engine torque $-j\dot\omega$. Thus, it is feasible to perform an adaption of the clutch characteristic curve and additional parameters of the clutch during slippage phases. In order to facilitate this adaptation, the slippage regulation is activated periodically in phases in which no slippage regulation is required in order to be able to perform an adaptation.

Thus it is provided that the active phase takes between 5 and 20 seconds, particularly preferably 10 seconds, while the inactive phase takes between 1 minute and 10 minutes, particularly preferably 3 minutes. Alternatively, the active phase is interrupted as soon as the adaptation is performed successfully. The duration of the active phase and the activation of the active phase can also be made a function of whether the clutch temperature has changed beyond a predetermined value. This value depends from the clutch system respectively used.
Activation under Temperature Changes in the Clutch for Adaptation When a large temperature change is detected in the clutch, e.g., after a hard startup or after cooling phases in the torque adjustment mode, the slippage control can be activated so that an adaptation can be performed. During torque adjustment, the clutch is maintained in adhering condition in that the clutch torque is kept higher than the engine torque.
Additional Activation Options for System Identification In order to identify the system, relevant clutch parameters like e.g. contact point, friction parameter, characteristic curve are identified which are used for adapting the parameters. It is helpful to activate the slippage control also in the subsequent situations:
- Activation after an active wear adjustment
- Activation after starting the vehicle or the clutch system like actuators and control device
- Activation during coasting operation for adapting and/or compensating the engine drag torque.

System Monitoring

Activation for Pull-Push Detection

When driving in synchronous mode, the slippage regulation can be activated in order to be able to determine whether push- or pull mode is provided. This information is essential for shifting strategy. The activation takes approximately 300 to 400 ms.
Slippage Monitoring In phases in which slippage control is not active, this means when the clutch is either completely closed or torque adjustment is provided, it is provided to monitor the slippage speed.

Through unfavorable adaptations or through imprecisions in torque signals, it can happen that too little clutch torque is erroneously adjusted. This is expressed through slippage. Through monitoring the slippage, the slippage control can immediately be activated when slippage occurs. The slippage is reduced through slippage regulation and subsequently the computation of the clutch torque is returned to the clutch control. Before that, the actual error is healed through an adaptation of the characteristic curve.

The slippage control is activated when a slippage activation criterion is fulfilled.

In one embodiment, the slippage regulation is activated when the amount of the slippage has a threshold value between 10 and 100 revolutions per minute, particularly advantageously 30 revolutions per minute.

In another alternative embodiment, the slippage control is activated as a function of the amount of the slippage, the duration of the slippage and the current drive train torque.

Activation during Creeping and/or Stopping to Provide Stall Protection

It is provided to activate the slippage regulation during creeping and alternatively or additionally during stopping in order to provide stall protection.

In order to insulate the drive train from the engine a slippage control is used through which a small slippage can be set at the clutch and thus insulation is achieved. The activation of the slippage control is provided automatically in all situations in which drive train insulation is required in order to avoid noises and vibrations. These situations are:

driving at critical engine speeds with or without an actuated brake
    push-pull and pull-push transitions
    load changes.

Furthermore, the slippage regulation is periodically activated in order to be able to perform adaptations and when slippage occurs for a closed clutch.

What is claimed is:

1. A method for controlling an automated friction clutch arranged between a drive engine and a transmission in a motor vehicle with slippage regulation and driving situation detection for detecting a currently provided driving situation, wherein the slippage regulation is only activated in at least one of the following driving conditions:

after startup,
    during temperature changes of the clutch,
    after wear adjustment,
    after starting up the motor vehicle,
    during creeping,
    during stopping, wherein the slippage activation criterion is fulfilled when the amount of the slippage is above a threshold value which is between 10 and 100 revolutions per minute, preferably 30 revolutions per minute.

2. The method according to claim 1, wherein a periodic activation of the slippage regulation is provided when no slippage regulation is activated.

3. The method according to claim 1, wherein an activation of the slippage regulation is performed during load changes when a degree of quantification with respect to the drive pedal actuation exceeds a threshold value.

4. The method according to claim 1, wherein a preload portion of the clutch control is reduced when the clutch control is activated during a load change.

5. A device for controlling an automated friction clutch, arranged between a drive motor and a transmission in a motor vehicle, with slippage regulation and a driving situation detection for determining a currently provided driving situation, wherein the slippage regulation is only activateable at least in one of the following driving conditions:

after startup,
    during temperature changes of the clutch,
    after wear adjustment,
    after starting up the motor vehicle,
    during creeping,
    during stopping, wherein the slippage activation criterion is fulfilled when the amount of the slippage is above a threshold value which is between 10 and 100 revolutions per minute, preferably 30 revolutions per minute.

* * * * *